United States Patent
Iwami

(10) Patent No.: US 7,901,300 B2
(45) Date of Patent: Mar. 8, 2011

(54) MULTI-PIECE SOLID GOLF BALL

(75) Inventor: Satoshi Iwami, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/732,468

(22) Filed: Dec. 11, 2003

(65) Prior Publication Data

US 2004/0121856 A1   Jun. 24, 2004

(30) Foreign Application Priority Data

Dec. 12, 2002 (JP) ................. 2002-360727

(51) Int. Cl.
*A63B 37/06* (2006.01)

(52) U.S. Cl. ........................................ 473/373

(58) Field of Classification Search ............. 473/377, 473/373, 374, 370
See application file for complete search history.

(56) References Cited

U.S. PATENT DOCUMENTS

| | | | | |
|---|---|---|---|---|
| 5,439,227 A | * | 8/1995 | Egashira et al. | 473/373 |
| 5,586,950 A | * | 12/1996 | Endo | 473/356 |
| 5,704,854 A | | 1/1998 | Higuchi et al. | |
| 5,730,663 A | * | 3/1998 | Tanaka et al. | 473/373 |
| 5,820,485 A | | 10/1998 | Hwang | |
| 5,820,486 A | * | 10/1998 | Tanaka et al. | 473/374 |
| 5,885,172 A | * | 3/1999 | Hebert et al. | 473/354 |
| 5,957,784 A | | 9/1999 | Whaley | |
| 6,015,356 A | * | 1/2000 | Sullivan et al. | 473/373 |
| 2001/0031669 A1 | * | 10/2001 | Ohama | 473/371 |
| 2002/0173380 A1 | | 11/2002 | Ohama et al. | |

FOREIGN PATENT DOCUMENTS

| | | |
|---|---|---|
| JP | 9-010358 A | 1/1997 |
| JP | 10-108923 A | 1/1997 |
| JP | 9-38238 A | 2/1997 |
| JP | 9-38238 A | 2/1997 |
| JP | 2002-239033 A | 8/2002 |

* cited by examiner

*Primary Examiner* — Raeann Trimiew

(74) *Attorney, Agent, or Firm* — Birch, Stewart, Kolasch & Birch, LLP

(57) ABSTRACT

The present invention provides a multi-piece solid golf ball, of which flight distance is improved by accomplishing high launch angle and low spin amount, when hit by golfers, who swing a golf club at low head speed, using a middle iron club to a driver. The present invention relates to multi-piece solid golf ball comprising a center, an intermediate layer formed on the center and a cover covering the intermediate layer, wherein the intermediate layer is formed from only one material having a flexural stiffness of 400 to 5,000 MPa.

5 Claims, 1 Drawing Sheet

MULTI-PIECE SOLID GOLF BALL

This Nonprovisional application claims priority under 35 U.S.C. §119(a) on Patent Application No(s). 2002-360727 filed in JAPAN on Dec. 12, 2002, the entire contents of which are hereby incorporated by reference.

FIELD OF THE INVENTION

The present invention relates to a multi-piece solid golf ball. More particularly, it relates to a multi-piece solid golf ball, of which flight distance is improved by accomplishing high launch angle and low spin amount, when hit by golfers, who swing a golf club at low head speed, using a middle iron club to a driver.

BACKGROUND OF THE INVENTION

In golf balls commercially selling, there are solid golf balls such as two-piece golf ball, three-piece golf ball and the like, and thread wound golf balls. Recently, the solid golf balls, of which flight distance can be improved while maintaining soft and good shot feel at the time of hitting as good as the conventional thread wound golf ball, generally occupy the greater part of the golf ball market. Multi-piece golf balls represented by three-piece golf ball have good shot feel while maintaining excellent flight performance, because they can vary hardness distribution, when compared with the two-piece golf ball.

Launch angle and backspin of golf ball have a great effect on trajectory of the golf ball hit by a golf club. The hit golf ball having large launch angle tends to have high trajectory, and the hit golf ball having small launch angle tends to have low trajectory. Since the backspin provides lift to the hit golf ball, the hit golf ball having large backspin amount tends to have high trajectory, and the hit golf ball having small backspin amount tends to have low trajectory. Performance requirements of golf balls from golfers include flight distance, shot feel, controllability and the like. When golfers use a golf club, particularly wood club (such as a driver), long iron club, middle iron club and the like, the flight distance is an important performance requirement.

In order to improve the flight distance when hit by a golf club such as a wood club, it is required for the hit golf ball to have high trajectory and long flight duration to a certain extent as well known. The hit golf ball having large launch angle and large backspin amount has high trajectory as described above, but the hit golf ball having too large backspin amount tends to have short flight distance. It is reason that kinetic energy is consumed by backspin, and that force applied such that the hit golf ball is pulled backward occurs by the lift until the golf ball reaches the highest point of the trajectory because the lift is applied perpendicular to the flight direction of the golf ball. Therefore, golf ball, of which the backspin amount is not very large and high trajectory is accomplished by high launch angle, has long flight distance when hit by a golf club, such as a wood club.

The shot feel is also an important performance requirement. When the shot feel is too hard, the golf ball has too short contact time with a golf club even if the backspin amount is small, and golfer can not easily hit the golf ball. On the other hand, when the shot feel is too soft, golfer feels that the golf ball has poor shot feel such that rebound characteristics are poor.

Based on the above knowledge, there has been many developments of golf ball having long flight distance accomplished by low backspin amount and high launch angle at the time of hitting, and good shot feel, from the viewpoint of formulation of the material and structure of the golf ball (Japanese Patent Kokai Publication Nos. 38238/1997, 239033/2002 and the like).

In Japanese Patent Kokai Publication No. 38238/1997, a golf ball comprising a core and a cover covering the core is disclosed. The cover has a two-layer structure composed of an outer cover and an inner cover, the inner cover is prepared from a resin composition having a flexural modulus of 5,000 to 12,000 kgf/cm$^2$ at 23° C. and a of 50%, and comprising a polyamide resin having a flexural modulus of 6,000 to 30,000 kgf/cm$^2$ at 23° C. and a relative humidity of 50% and a thermoplastic elastomer having a JIS-A hardness of 30 to 98, in a weight ratio of polyamide resin:thermoplastic elastomer within the range of 95:5 to 50:50.

In Japanese Patent Kokai Publication No. 239033/2002, a multi-piece solid golf ball comprising a core, an inner cover formed on the core and an outer cover covering the inner cover is disclosed. The inner cover has a Shore D hardness of 30 to 62, and is formed from an inner cover composition comprising (a) 50 to 95 parts by weight of ethylene-(meth)acrylic acid copolymer ionomer resin, and (b) 5 to 50 parts by weight of thermoplastic elastomer formed from a polymer alloy of an olefin with a block copolymer having styrene block, based on 100 parts by weight of a base resin, and the block copolymer having styrene block is selected from the group consisting of styrene-butadiene-styrene block copolymer (SBS), hydrogenation product of SBS, styrene-isoprene-styrene block copolymer (SIS), hydrogenation product of SIS, styrene-isoprene-butadiene-styrene block copolymer (SIBS), and hydrogenation product of SIBS, the outer cover is formed from an outer cover composition comprising ionomer resin as a main component, and has a Shore D hardness of 58 to 68, and the hardness of the outer cover is higher than that of the inner cover.

However, it has been required to provide golf balls, of which the flight distance and shot feel are improved still more. Therefore, there has been no golf ball, which is sufficient to the balance between excellent flight performance by accomplishing small backspin amount and high launch angle at the time of hitting, and good shot feel at the time of hitting.

OBJECTS OF THE INVENTION

A main object of the present invention is to provide a multi-piece solid golf ball, of which flight distance is improved by accomplishing high launch angle and low spin amount, when hit by golfers, who swing a golf club at low head speed, using a middle iron club to a driver.

According to the present invention, the object described above has been accomplished by providing a multi-piece solid golf ball comprising a core consisting of a center, an intermediate layer and a cover; and by using one material having a specified flexural stiffness alone for the intermediate layer to adjust the flexural stiffness of the intermediate layer to a specified range, thereby providing a multi-piece solid golf ball, of which flight distance is improved by accomplishing high launch angle and low spin amount, when hit by golfers, who swing a golf club at low head speed, using a middle iron club to a driver.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accomplishing drawings which are given by way of illustrating only, and thus are not limitative of the present invention, and wherein.

SUMMARY OF THE INVENTION

Figure 1:
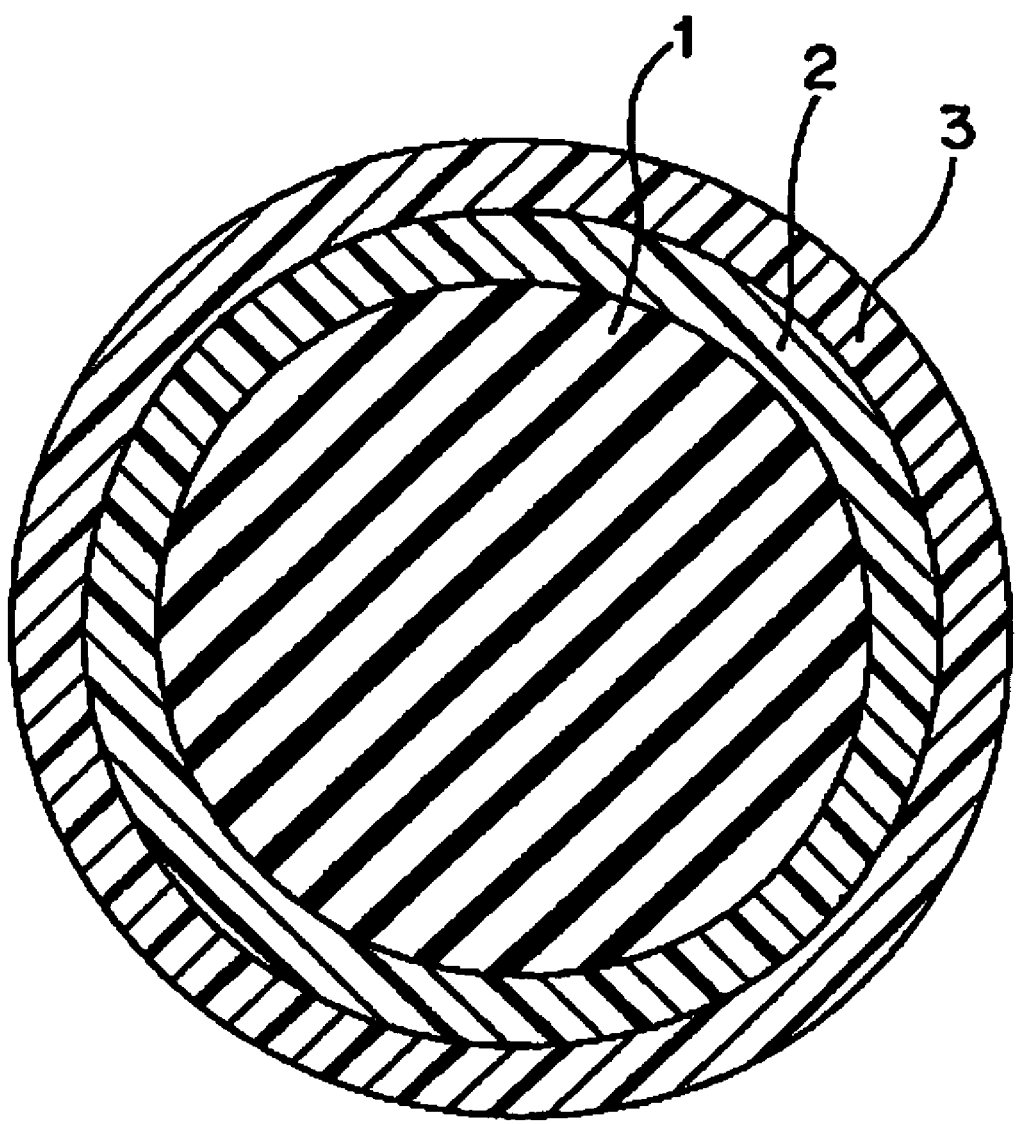
FIG. 1 is a schematic cross section illustrating one embodiment of the golf ball of the present invention.

The present invention provides a multi-piece solid golf ball comprising a center, an intermediate layer formed on the center and a cover covering the intermediate layer, wherein the intermediate layer is formed from only one material having a flexural stiffness of 400 to 5,000 MPa.

In order to improve flight distance by accomplishing high launch angle and low spin amount of the golf ball, the present inventors have studied structure and material of the resulting golf ball. As a result, it was apparent that the flexural stiffness difference between the center and intermediate layer was large to accomplish high launch angle and low spin amount as an important factor of flight distance, which improves the flight distance by using one material having a flexural stiffness of 400 to 5,000 MPa alone for the intermediate layer. There have been golf balls obtained by using material having high flexural modulus for the intermediate layer as prior art. However, since low hardness material was blended with the material for the intermediate layer, it was problem to degrade the durability and rebound characteristics of the resulting golf ball. Detailed mechanism thereof has not been known, but it is considered that the compatibility and dispersibility are degraded by using the blend of high flexural modulus material and low hardness material to degrade the performances of the golf ball.

In order to put the present invention into a more suitable practical application, it is preferable that the intermediate layer be formed from one of the group consisting of polyurethane-based thermoplastic elastomer, polyolefin-based thermoplastic elastomer, polycarbonate resin, polybutylene terephthalate resin, polyethylene terephthalate resin, polyacetal resin, modified polyphenylene ether resin, polyimide resin and ionomer resin, or modified compound thereof;

the intermediate layer have a thickness of 0.5 to 2.0 mm;

the intermediate layer have a flexural stiffness of higher than 500 to not more than 3,000 MPa; and the intermediate layer have a flexural stiffness of 700 to 2,000 MPa.

DETAILED DESCRIPTION OF THE INVENTION

The multi-piece solid golf ball of the present invention will be explained with reference to the accompanying drawing in detail. FIG. 1 is a schematic cross section illustrating one embodiment of the multi-piece solid golf ball of the present invention. As shown in FIG. 1, the golf ball of the present invention comprises a center 1, an intermediate layer 2 formed on the center and a cover 3 covering the center. The center 1 is obtained by press-molding a rubber composition under applied heat by using a method and condition, which has been conventionally used for preparing solid cores of golf balls. The rubber composition contains a base rubber, a co-crosslinking agent, an organic peroxide, a filler and the like.

The base rubber used for the center of the present invention may be synthetic rubber, which has been conventionally used for cores of solid golf balls. Preferred is high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be α,β-unsaturated carboxylic acid having 3 to 8 carbon atoms (such as acrylic acid, methacrylic acid, etc.) or mono or divalent metal salts thereof, such as zinc or magnesium salts thereof, or mixtures thereof. The preferred co-crosslinking agent is zinc acrylate, because it imparts high rebound characteristics to the resulting golf ball. The amount of the co-crosslinking agent is from 20 to 40 parts by weight, preferably from 22 to 35 parts by weight, more preferably from 22 to 32 parts by weight, based on 100 parts by weight of the base rubber. When the amount of the co-crosslinking agent is smaller than 20 parts by weight, the vulcanization degree of the rubber composition is not sufficiently obtained, and the center is too soft. Therefore, the rebound characteristics of the resulting golf ball are degraded, which reduces the flight distance. On the other hand, when the amount of the co-crosslinking agent is larger than 40 parts by weight, the resulting golf ball is too hard, and the shot feel is poor.

The organic peroxide, which acts as a crosslinking agent or curing agent, includes, for example, dicumyl peroxide, 1,1-bis(t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.1 to 3.0 parts by weight, preferably 0.1 to 2.8 parts by weight, more preferably 0.2 to 2.5 parts by weight, based on 100 parts by weight of the base rubber. When the amount of the organic peroxide is smaller than 0.1 parts by weight, the center is too soft, and the rebound characteristics of the resulting golf ball are degraded, which reduces the flight distance. On the other hand, when the amount of the organic peroxide is larger than 3.0 parts by weight, the center is too hard, and the shot feel of the resulting golf ball is poor.

The filler, which can be typically used for the core of solid golf ball, includes for example, inorganic filler (such as zinc oxide, barium sulfate, calcium carbonate and the like), high specific gravity metal powder filler (such as tungsten powder, molybdenum powder and the like), and the mixture thereof. The amount of the filler, which can vary depending to the specific gravity, size and the like of the cover and center, is not limited, but is from 5 to 50 parts by weight, based on 100 parts by weight of the base rubber, which can be typically used for the core of solid golf ball.

The rubber compositions for the center 1 of the golf ball of the present invention can contain other components, which have been conventionally used for preparing the core of solid golf balls, such as antioxidant or peptizing agent, sulfur and the like. If used, the amount of the antioxidant is preferably from 0.1 to 2.0 parts by weight, the amount of the peptizing agent is preferably from 0.1 to 2.0 parts by weight, the amount of the sulfur is preferably from 0.01 to 1.0 parts by weight, based on 100 parts by weight of the base rubber.

The center 1 used for the golf ball of the present invention is obtained by vulcanizing and press-molding under applied heat the rubber composition in a mold. The vulcanization may be conducted, for example, by press molding at 130 to 180° C. and 2.8 to 9.8 MPa for 15 to 50 minutes, but the condition thereof is not particularly limited.

In the golf ball of the present invention, the center 1 has a diameter of 37.2 to 41.2 mm, preferably 38.4 to 41.2 mm, more preferably 39.4 to 40.8 mm. When the diameter of the center is smaller than 37.2 mm, the thickness of the intermediate layer or cover is large. When the thickness of the intermediate layer is large, the resulting golf ball is too hard, and when the thickness of the cover is large, the rebound characteristics of the resulting golf ball are degraded. On the other hand, when the diameter of the center is larger than 41.2 mm, the thickness of the intermediate layer or cover is small, the durability of resulting golf ball is poor.

In the golf ball of the present invention, it is desired for the center 1 to have a deformation amount when applying from an initial load of 98 N to a final load of 1275 N of 3.0 to 6.0 mm, preferably 3.3 to 5.5 mm, more preferably 3.5 to 5.0 mm. When the deformation amount of the center is smaller than 3.0 mm, the center is too hard, and it is difficult to deform the center at the time of hitting, which degrades the shot feel of the resulting golf ball. On the other hand, when the deformation amount is larger than 6.0 mm, the center excessively deforms at the time of hitting, which degrades the durability. The intermediate layer 2 is then formed on the center 1.

In the golf ball of the present invention, it is required for the intermediate layer to be formed from only one material having a flexural stiffness of 400 to 5,000 MPa, preferably higher than 500 to not more than 3,000 MPa, 700 to 2,000 MPa. When the flexural stiffness of the material for the intermediate layer is lower than 400 MPa, the technical effects accomplished by high launch angle and low spin amount are not sufficiently obtained. On the other hand, when the flexural stiffness of the material for the intermediate layer is higher than 5,000 MPa, the shot feel is hard and poor. In addition, the durability is poor. In the golf ball of the present invention, it is required for the intermediate layer to be formed from only one material having a specified flexural stiffness as described above. If using a blend of two or more materials, as compared with solely using one material, the durability is mainly degraded and the rebound characteristics are also degraded. Detailed mechanism thereof has not been known, but it is considered that the compatibility between the materials for the intermediate layer is degraded and the dispersibility of the whole intermediate layer are degraded.

The flexural stiffness is flexural stiffness measured according to JIS K 7106, using a sample of a stack of the three or more heat and press molded sheets (slab) having a thickness of about 2 mm from the material for the intermediate layer, which had been stored at 23° C. for 2 weeks. In the golf ball of the present invention, the intermediate layer is formed from only one material having a flexural stiffness of 400 to 5,000 MPa as described above. Therefore, the resulting intermediate layer 2 formed from the material has the value of the flexural stiffness.

In the golf ball of the present invention, the material for the intermediate layer 2 is not limited as long as the intermediate layer is formed from only one material having the above value of the flexural stiffness, but includes one of the group consisting of thermoplastic elastomer, such as polyurethane-based thermoplastic elastomer, polyolefin-based thermoplastic elastomer, polyester-based thermoplastic elastomer, polyamide-based thermoplastic elastomer, polycarbonate resin, polybutylene terephthalate resin, polyethylene terephthalate resin, polyacetal resin, modified polyphenylene ether resin, polyimide resin and ionomer resin; or one of the modified compound of polycarbonate resin, polybutylene terephthalate resin, polyethylene terephthalate resin and polyacetal resin.

Concrete examples of the materials for the intermediate layer include thermoplastic elastomers, such as polyurethane-based thermoplastic elastomer, commercially available from BASF Japan Co., Ltd. under the trade name "Elastollan XHM76D", polyolefin-based thermoplastic elastomer, commercially available from Japan Polychem corporation under the trade name "Wintech XK1159", polyester-based thermoplastic elastomer, which is commercially available from Toray-Do Pont Co., Ltd. under the trade name of "Hytrel 7047", polyamide-based thermoplastic elastomer, which is commercially available from Toray Co., Ltd. under the trade name of "Pebax 7233" and the like; polycarbonate resin (Polymer alloy (PC/ABS) grade), commercially available from Mitsubishi Engineering-Plastics Corporation under the trade name "Iupilon" (such as "Iupilon PM1220") and a modified compound thereof; polyacetal resin, commercially available from Mitsubishi Engineering-Plastics Corporation under the trade name Iupital (such as "Iupital FU2025") and a modified compound thereof; polybutylene terephthalate, commercially available from Mitsubishi Engineering-Plastics Corporation under the trade name "Novadurn" (such as "Novadurn 5010R3"); polyethylene terephthalate resin, commercially available from Mitsubishi Engineering-Plastics Corporation under the trade name "Novapet" (such as "Novapet 6010G15"); modified polyphenylene ether resin, commercially available from Mitsubishi Engineering-Plastics Corporation under the trade name "Lemalloy" (such as "Lemalloy BX505"); polyimide resin, commercially available from Ube Industries, Ltd. under the trade name "Upilex" (such as "Upilex 25S"); ionomer resin, commercially available from Du Pont Co. under the trade name "Surlyn" (such as "Surlyn 8140 (Na)", "Surlyn 8150 (Na)", "Surlyn 9120 (Zn)", "Surlyn 6120 (Mg)", "Surlyn AD8546 (Li)") and a modified compound thereof by metal salt or higher fatty acid metal salt; and the like.

The wording "the intermediate layer is formed from (only) one material" as used herein means that the material for the intermediate layer may contain a small amount of a material, which has few effects on the dispersibility and compatibility thereof, for example, in the amount of smaller than 3 parts by weight, based on 100 parts by weight of the material for the intermediate layer.

A method of covering the center 1 with the intermediate layer 2 is not specifically limited, but may be conventional methods, which have been known to the art and used for forming the cover of the golf balls. For example, there can be used a method comprising molding the intermediate layer composition into a semi-spherical half-shell in advance, covering the center with the two half-shells, followed by press molding, or a method comprising injection molding the intermediate layer composition directly on the center, which is covered with the cover, to cover it. The injection molding is suitably used in view of moldability.

In the golf ball of the present invention, it is desired for the intermediate layer 2 to have a thickness of 0.5 to 2.0 mm, preferably 0.8 to 1.8 mm, more preferably 0.9 to 1.5 mm. When the thickness of the intermediate layer is smaller than 0.5 mm, the technical effects accomplished by high flexural stiffness of the intermediate layer are not sufficiently obtained. On the other hand, when the thickness of the intermediate layer is larger than 2.0 mm, the resulting golf ball is too hard, and the shot feel is hard and poor. The cover 3 is then covered on the intermediate layer 2.

The materials for the cover used in the golf ball of the present invention, which may be thermoplastic resin or thermosetting resin, are not limited, but are selected from the group consisting of thermoplastic elastomer, such as polyurethane-based thermoplastic elastomer, polyolefin-based thermoplastic elastomer, polyester-based thermoplastic elastomer, polyamide-based thermoplastic elastomer, polystyrene-based thermoplastic elastomer, and mixtures thereof or modified compounds thereof. Preferred is polyurethane-based thermoplastic elastomer in view of scuff resistance and controllability.

Concrete examples of the materials for the cover include polyurethane-based elastomer, which is commercially available from BASF Japan Co., Ltd. under the trade name of "Elastollan" (such as "Elastollan XNY97A"); olefin-based thermoplastic elastomer available from Mitsubishi Chemical Co., Ltd. under the trade name "Thermoran" (such as "Thermoran 3981N"); polyolefin-based thermoplastic elastomer, which is commercially available from Sumitomo Chemical Co., Ltd. under the trade name of "Sumitomo TPE" (such as "Sumitomo TPE3682" and "Sumitomo TPE9455"); polyester-based thermoplastic elastomer, which is commercially available from Toray-Du Pont Co., Ltd. under the trade name of "Hytrel" (such as "Hytrel 3548", "Hytrel 4047"); polyamide-based thermoplastic elastomer, which is commercially available from Atofina Japan Co., Ltd. under the trade name of "Pebax" (such as "Pebax 2533"); styrene-based thermoplastic elastomer available from Asahi Kasei corporation under the trade name "Tuftec" (such as "Tuftec H1051"); and the like.

The composition for the cover 3 used in the present invention may optionally contain fillers (such as barium sulfate), pigments (such as titanium dioxide) and the other additives such as a dispersant, an antioxidant, a UV absorber, a photostabilizer and a fluorescent agent or a fluorescent brightener, etc., in addition to the resin component as long as the addition of the additives does not deteriorate the desired performance of the golf ball cover. If used, the amount of the pigment is preferably 0.1 to 5.0 parts by weight, based on 100 parts by weight of the base resin for the cover.

A method of covering on the intermediate layer 2 with the cover 3 may be the same as the method of covering the center 1 with the intermediate layer 2. In the golf ball of the present invention, it is desired for the cover 3 to have a thickness of 0.3 to 2.0 mm, preferably 0.5 to 1.6 mm, more preferably 0.8 to 1.2 mm. When the thickness is smaller than 0.3 mm, it is difficult to mold the cover. On the other hand, when the thickness is larger than 2.0 mm, the rebound characteristics of the resulting golf ball are degraded.

In golf ball of the present invention, it is desired for the cover 3 to have a Shore D hardness of 20 to 55, preferably 25 to 52, more preferably 30 to 50. When the cover hardness is lower than 20, the cover is too soft, and the rebound characteristics of the resulting golf ball are degraded. On the other hand, when the cover hardness is higher than 55, the cover is too hard, and the spin amount at approach shot is too small, which degrades the controllability. The term "a cover hardness" as used herein refers to the hardness measured using a sample of a stack of the three or more heat and press molded sheets having a thickness of about 2 mm from the cover composition, which had been stored at 23° C. for 2 weeks.

At the time of molding the cover, many depressions called "dimples" are formed on the surface of the golf ball. Furthermore, paint finishing or marking with a stamp may be optionally provided after the cover is molded for commercial purposes. The golf ball of the present invention is formed, so that it has a diameter of not less than 42.67 mm (preferably 42.67 to 42.82 mm) and a weight of not more than 45.93 g, in accordance with the regulations for golf balls.

In the golf ball of the present invention, it is desired to have a deformation amount when applying from an initial load of 98 N to a final load of 1275 N of 2.4 to 3.5 mm, preferably 2.5 to 3.2 mm, more preferably 2.6 to 3.0 mm. When the deformation amount is smaller than 2.4 mm, the golf ball is too hard, and the shot feel is hard and poor. On the other hand, when the deformation amount is larger than 3.5 mm, the golf ball is too soft, and the shot feel is heavy and poor.

EXAMPLES

The following Examples and Comparative Examples further illustrate the present invention in detail but are not to be construed to limit the scope of the present invention.

Production of Center

The rubber compositions having the formulation shown in Table 1 were mixed with a mixing roll, and the mixtures were then press-molded at 170° C. for 15 minutes in the mold to obtain spherical center having a diameter of 38.4 mm. The deformation amount of the resulting center was measured, and the result is shown in the same Table. The test method is described later.

TABLE 1

|  |  | (parts by weight) | | | | |
| --- | --- | --- | --- | --- | --- | --- |
| Center composition |  | A | B | C | D | E |
| BR-18 | *1 | 100 | 100 | 100 | 100 | 100 |
| Zinc acrylate |  | 30.0 | 29.0 | 27.5 | 26.0 | 24.5 |
| Zinc oxide |  | 5.0 | 5.0 | 5.0 | 5.0 | 5.0 |
| Barium sulfate |  | 17.5 | 15.0 | 9.5 | 5.0 | 10.0 |
| Dicumyl peroxide | *2 | 0.8 | 0.8 | 0.8 | 0.8 | 0.8 |
| Diphenyl disulfide | *3 | 0.5 | 0.5 | 0.5 | 0.5 | 0.5 |
| Deformation amount (mm) |  | 3.55 | 3.60 | 4.20 | 4.40 | 4.60 |

*1: High-cis polybutadiene commercially available from JSR Co., Ltd., under the trade name "BR-18" (Content of cis-1,4-polybutadiene = 96%)
*2: Dicumyl peroxide, commercially available from Nippon Oil & Fats Co., Ltd. under the trade name of "Percumyl D"
*3: Diphenyl disulfide, commercially available from Sumitomo Seika Co., Ltd.

Preparation of Intermediate Layer and Cover Compositions

The formulation materials for the intermediate layer and cover showed in Tables 2 and 3 were mixed using a kneading type twin-screw extruder to obtain pelletized intermediate layer and cover compositions. The extrusion condition was,
a screw diameter of 45 mm,
a screw speed of 200 rpm, and
a screw LD of 35.
The formulation materials were heated at 200 to 260° C. at the die position of the extruder. The flexural stiffness of the intermediate layer was measured according to JIS K 7106, using a sample of a stack of the three or more heat and press molded sheets (slab) having a thickness of about 2 mm from the resulting intermediate layer compositions, which had been stored at 23° C. for 2 weeks. The results are shown in Tables 2 to 5. The cover hardness was measured using a Shore D hardness meter according to ASTM-D2240, using a sample of a stack of the three or more heat and press molded sheets having a thickness of about 2 mm from the resulting cover compositions, which had been stored at 23° C. for 2 weeks. The results are shown in Table 4 (Examples) and Table 5 (Comparative Examples).

TABLE 2

| Intermediate layer and cover composition |  | I | II | III | IV | V |
| --- | --- | --- | --- | --- | --- | --- |
| Pebax 7233 | *4 | — | 100 | — | — | — |
| Elastollan XHM76D | *5 | — | — | 100 | — | — |
| Iupital FU2025 | *6 | — | — | — | 100 | — |
| Iupilon PM1220 | *7 | — | — | — | — | 100 |
| Hi-milan 1605 | *8 | — | — | — | — | — |
| Hi-milan 1706 | *9 | — | — | — | — | — |

TABLE 2-continued

| Intermediate layer and cover composition | | I | II | III | IV | V |
|---|---|---|---|---|---|---|
| Elastollan ET864D | *10 | — | — | — | — | — |
| Elastollan XNY97A | *11 | — | — | — | — | — |
| Rilsan AMNO | *12 | — | — | — | — | — |
| Novapet 6010G15 | *13 | 100 | — | — | — | — |
| Titanium dioxide | | — | — | — | — | — |
| Flexural stiffness (MPa) | | 5300 | 420 | 700 | 900 | 1200 |

TABLE 3

| Intermediate layer and cover composition | | VI | VII | VIII | IX |
|---|---|---|---|---|---|
| Pebax 7233 | *4 | — | — | — | — |
| Elastollan XHM76D | *5 | — | — | — | — |
| Iupital FU2025 | *6 | — | — | — | — |
| Iupilon PM1220 | *7 | — | — | — | — |
| Hi-milan 1605 | *8 | 50 | — | — | — |
| Hi-milan 1706 | *9 | 50 | — | — | — |
| Elastollan ET864D | *10 | — | 100 | — | — |
| Elastollan XNY97A | *11 | — | — | 100 | 5 |
| Rilsan AMNO | *12 | — | — | — | 95 |
| Novapet 6010G15 | *13 | — | — | — | — |
| Titanium dioxide | | — | — | 2 | — |
| Flexural stiffness (MPa) | | 300 | 300 | 40 | 480 |

4: Pebax 7233 (trade name), polyamide-based thermoplastic elastomer, commercially available from Atofina Japan Co., Ltd.; Flexural stiffness=420 MPa 5: Elastollan XHM76D (trade name), polyurethane-based thermoplastic elastomer formed by using 4,4'-diphenylmethane diisocyanate, commercially available from BASF Japan Co., Ltd.; Flexural stiffness=700 MPa 6: Iupital FU2025 (trade name), polyacetal resin (Impact resistance grade), commercially available from Mitsubishi Engineering-Plastics Corporation; Flexural stiffness=900 MPa 7: Iupilon PM1220 (trade name), polycarbonate resin (Polymer alloy (PC/ABS) grade), commercially available from Mitsubishi Engineering-Plastics Corporation; Flexural stiffness=1200 MPa 8: Hi-milan 1605 (trade name), ethylene-methacrylic acid copolymer ionomer resin obtained by neutralizing with sodium ion, manufactured by Du Pont-Mitsui Polychemicals Co., Ltd.; Flexural stiffness=295 MPa 9: Hi-milan 1706 (trade name), ethylene-methacrylic acid copolymer ionomer resin obtained by neutralizing with zinc ion, manufactured by Du Pont-Mitsui Polychemicals Co., Ltd.; Flexural stiffness=300 MPa 10: Elastollan ET864D (trade name), polyurethane-based thermoplastic elastomer formed by using 4,4'-diphenylmethane diisocyanate, commercially available from BASF Japan Co., Ltd.; Flexural stiffness=300 MPa 11: Elastollan XNY97A (trade name), polyurethane-based thermoplastic elastomer formed by using 4,4'-dicyclohexylmethane diisocyanate ($H_{12}$MDI)-polyoxytetramethylene glycol (PTMG), commercially available from BASF Japan Co., Ltd.; Shore A (JIS-A) hardness=97, Flexural stiffness=40 MPa 12: Rilsan AMNO (trade name), nylon-12, commercially available from Atofina Japan Co., Ltd.; Flexural stiffness=500 MPa 13: Novapet 6010G15 (trade name), polyethylene terephthalate resin, commercially available from Mitsubishi Engineering-Plastics Corporation; Flexural stiffness=5300 MPa Formation of the Intermediate Layer The resulting intermediate layer compositions were covered on the center by injection molding to form a intermediate layer having a thickness of 1.4 mm.

Examples 1 to 4 and Comparative Examples 1 to 4

The cover compositions were covered on the intermediate layer by injection molding using a mold having dimples to form a cover layer having a thickness of 0.8 mm. After deflashing, paint was applied on the surface to obtain golf ball having a diameter of 42.8 mm and a weight of 45.4 g. With respect to the resulting golf balls, the deformation and flight performance (launch angle, spin amount and flight distance) were measured. The results are shown in the Table 4 (Examples) and Table 5 (Comparative Examples). The test methods are as follows.

(Test Methods)

(1) Deformation Amount

The deformation amount of the center or golf ball was determined by measuring a deformation amount when applying from an initial load of 98 N to a final load of 1275 N golf ball.

(2) Cover Hardness

The cover hardness was determined by measuring a Shore D hardness, using a sample of a stack of the three or more heat and press molded sheets having a thickness of about 2 mm from the cover composition, which had been stored at 23° C. for 2 weeks. The Shore D hardness was measured by using an automatic rubber hardness tester (type LA1), which is commercially available from Kobunshi Keiki Co., Ltd., with a Shore D hardness meter according to ASTM D 2240.

(3) Flight Distance

After a No.1 wood club (W#1, a driver) having a metal head was mounted to a swing robot manufactured by True Temper Co. and the golf ball was hit at a head speed of 45 m/sec, the launch angle and spin amount (backspin amount) immediately after hitting, and flight distance were measured. As the flight distance, carry that is a distance to the drop point of the hit golf ball was measured. The measurement was conducted 5 times for each golf ball (n=5), and the average is shown as the result of the golf ball.

(Test Results)

TABLE 4

| | Example No. | | | |
|---|---|---|---|---|
| Test item | 1 | 2 | 3 | 4 |
| (Center) | | | | |
| Composition (Intermediate layer) | B | C | D | E |
| Composition | II | III | IV | V |
| Flexural rigidity (MPa) (Cover) | 420 | 700 | 900 | 1200 |
| Composition | VIII | VIII | VIII | VIII |
| Hardness (Shore D) (Golf ball) | 47 | 47 | 47 | 47 |
| Deformation amount (mm) (Flight performance) | 2.76 | 2.78 | 2.72 | 2.64 |
| Launch angle (degree) | 11.4 | 11.5 | 11.6 | 11.7 |
| Spin amount (rpm) | 2800 | 2870 | 2850 | 2800 |
| Flight distance | 100 | 101 | 102 | 103 |

TABLE 5

| Test item | Comparative Example No. | | | |
|---|---|---|---|---|
| | 1 | 2 | 3 | 4 |
| (Center) | | | | |
| Composition (Intermediate layer) | D | A | C | B |
| Composition Flexural rigidity (MPa) | I 5300 | VI 300 | VII 300 | IX 480 |
| (Cover) | | | | |
| Composition Hardness (Shore D) | VIII 47 | VIII 47 | VIII 47 | VIII 47 |
| (Golf ball) | | | | |
| Deformation amount (mm) | 2.30 | 2.81 | 2.93 | 2.62 |
| (Flight performance) | | | | |
| Launch angle (degree) | 10.5 | 10.8 | 10.7 | 10.9 |
| Spin amount (rpm) | 3400 | 3100 | 3120 | 3080 |
| Flight distance | 95 | 99 | 97 | 99 |

As is apparent from Tables 4 to 5, the golf balls of Examples 1 to 4 of the present invention, when compared with the golf balls of Comparative Examples 1 to 4, have long flight distance by accomplishing high launch angle and low spin amount.

On the other hand, in the golf ball of Comparative Example 1, since the flexural stiffness of the intermediate layer is high, the deformation amount of the resulting golf ball is small. In addition, the launch angle is small and the spin amount is large, which reduces the flight distance. In the golf ball of Comparative Example 2, since the flexural stiffness of the intermediate layer is low and the intermediate layer is formed from a blend of two materials, the launch angle is small and the spin amount is large, which reduces the flight distance.

In the golf ball of Comparative Example 3, since the flexural stiffness of the intermediate layer is low, the launch angle is small and the spin amount is large, which reduces the flight distance. In the golf ball of Comparative Example 4, the flexural stiffness of the intermediate layer is within the range of the present invention. However, since the intermediate layer is formed from a blend of two materials, the compatibility is poor, which degrades the durability of the resulting golf ball.

What is claimed is:

1. A multi-piece solid golf ball comprising a center, an intermediate layer formed on the center and a cover covering the intermediate layer,
    wherein the intermediate layer consists essentially of a single material having a flexural stiffness of 700 to 1,200 MPa, selected from the group of chemicals consisting of: polyurethane-based thermoplastic elastomer, polycarbonate resin, and polyacetal resin,
    wherein the cover is formed from a polyurethane-based thermoplastic elastomer,
    wherein the center is formed from a rubber composition which comprises a peptizing agent in an amount of 0.1 to 2.0 based on 100 parts by weight of a base rubber, and the center has a deformation amount of 3.0 to 6.0 mm when applying from an initial load of 98 N to a final load of 1275 N, and
    wherein the golf ball has a deformation amount of 2.4 to 3.5 mm when applying from an initial load of 98 N to a final load of 1275 N.

2. The multi-piece solid golf ball according to claim 1, wherein the intermediate layer has a thickness of 0.5 to 2.0 mm.

3. The multi-piece solid golf ball according to claim 1, wherein the intermediate layer has a thickness of 0.8 to 1.8 mm.

4. The multi-piece solid golf ball according to claim 1, wherein the intermediate layer has a thickness of 0.9 to 1.5 mm.

5. The multi-piece solid golf ball according to claim 1, wherein the intermediate layer consists essentially of a single compound selected from polyurethane-based thermoplastic elastomer and polyacetal resin.

* * * * *